United States Patent Office 3,522,003
Patented July 28, 1970

3,522,003
PROCESS AND APPARATUS FOR PRODUCING PHOSPHORIC ACID FROM PHOSPHATE ROCK
Edwin B. Lopker, Fort Lauderdale, Fla., assignor to Pullman Incorporated, Chicago, Ill., a corporation of Delaware
Continuation-in-part of application Ser. No. 518,229, Jan. 3, 1966. This application Apr. 19, 1966, Ser. No. 543,648
Int. Cl. C01f 1/46; C01b 25/22
U.S. Cl. 23—165          19 Claims

ABSTRACT OF THE DISCLOSURE

The invention concerns a process for the manufacture of phosphoric acid (and calcium sulfate by-product) by the reaction of calcium phosphate and sulfuric acid which includes circulating the entire reactant mass at a high rate of circulation within the reactant system and adding controlled quantities of calcium phosphate rock, sulfuric acid and recycle phosphoric acid reactants separately from one another into the reactant system in a manner controlled as to location of the points of addition and/or the time sequence of addition of each reactant so as to control calcium sulfate concentration gradients and thereby prevent excessive formation of fine calcium sulfate crystals. Cooling of the reactant system is carried out by evaporative cooling of the entire recirculating reactant mass so that the temperature gradients resulting from removal of the heat of reaction are not so large as to occasion excessive fine crystal formation.

---

This application is a continuation-in-part of application Ser. No. 518,229, filed Jan. 3, 1966, now abandoned.

This invention relates to the manufacture of phosphoric acid by the wet process, i.e., the reaction of phosphate rock with sulfuric acid to produce phosphoric acid and calcium sulfate, and to the apparatus for carrying out this process.

The basic reactions taking place in the wet process for the manufacture of phosphoric acid are well known. Phosphate rock is added to a quantity of phosphoric acid, usually to a slurry of phosphoric acid and calcium sulfate crystals in the reactor system, and the phosphate rock is dissolved by part of the phosphoric acid. Sulfuric acid is concurrently added and reacts with the dissolved phosphate to form phosphoric acid and calcium sulfate. The calcium sulfate crystallizes out and is separated from the phosphoric acid by filtration and washing. The calcium sulfate crystallizes as gypsum ($CaSO_4 \cdot 2H_2O$) under the conditions employed in most commercial operations of the process and the crystals are washed essentially free of phosphoric acid in the filtration system, using water, and the washings are returned to the reactor system.

It is desired in commercial variations of this process to introduce the phosphate rock and the sulfuric acid to the reactor system in such a manner and under such conditions that excessive concentrations of dissolved phosphate rock do not occur in the reactor system, as well as to avoid excessive concentrations of unreacted sulfuric acid in the reactor system. If an excessive concentration of sulfuric acid contacts the phosphate rock before it dissolves, it will coat the particle of phosphate rock with calcium sulfate and inhibit further attack. This results in excessive losses due to unreacted phosphate rock lost with the calcium sulfate. On the other hand, an excessive concentration of dissolved phosphate rock results in the crystallization of calcium phosphate, concurrently with the crystallization of the calcium sulfate. This also results in loss of phosphate values as the co-crystallization of the phosphate and calcium sulfate precludes washing the phosphate out of the calcium sulfate in the filtration and washing system. In addition, if contact occurs in the reactor system between excessive concentrations of sulfuric acid and dissolved phosphate the resulting calcium sulfate is formed so rapidly and in such high concentration that it precipitates in very fine crystals with the result that efficient separation of the phosphoric acid from the calcium sulfate in the subsequent filtration operation is adversely affected. And still further, such excessive concentrations and wide variations in the reactor system cause excessive scaling of the internal surfaces of the reactor system, resulting in the need for shutting down the system at periodic intervals for cleaning. Accurate control of the operating conditions in the reactor system is essential as the ratio of calcium to sulfate in the solution influences to a marked degree the filterability of the calcium sulfate crystals produced.

The degree of hydration, if any, of the calcium sulfate crystals formed in the reactor system is dependent upon the temperature level and the phosphoric acid content that is maintained in the reactor system slurry. For example, at a temperature of 75 to 80 degrees centigrade and with 32% $P_2O_5$ phosphoric acid the calcium sulfate will crystallize essentially as gypsum ($CaSO_4 \cdot 2H_2O$). At a temperature of 95 to 100 degrees centigrade and with 40% $P_2O_5$ phosphoric acid the calcium sulfate will crystallize essentially as the hemihydrate ($CaSO_4 \cdot \frac{1}{2}H_2O$). There are certain limitations that apply to the selection of temperatures and phosphoric acid strengths that may be proposed for any reactor system. For example, the selection of a lower temperature say 75 degrees centigrade, in combination with a high phosphoric acid strength, say 40% $P_2O_5$, would result, with most types of phosphate rock, in the formation of the calcium sulfate as an unstable mixture of gypsum and hemihydrate crystals with hydration and caking occurring on the filter when washing was attempted. In such a case, raising the temperature to say 95 degrees centigrade would produce essentially all of the calcium sulfate as a stable hemihydrate. Conversely, if the temperature was held at 75 degrees centigrade and the phosphoric acid strength reduced to say 32% $P_2O_5$, essentially all of the calcium sulfate would crystallize as a stable gypsum. There are other factors affecting the type of crystals formed in, and their growth in, the reactor system and their filterability. Some of these factors are the fluorine content, the alumina content, the active silica content and its ratio to the fluorine content, etc., only the major factors which generally apply being outlined above.

Most of the reactor systems presently in commercial operation employ some means of recirculation of a slurry of phosphoric acid and coucium sulfate crystals in order to minimize the excessive concentrations that have been referred to. Generally this recirculation consists of a combination of the so-called "recirculation" produced by a stirrer or agitator in a tank plus some degree of actual recirculation by returning reactor slurry from a later stage of the reactor system to an earlier stage. The various commercially employed systems can be conveniently separated into two groups. In the first group may be placed the so-called "single-tank" reactor systems and in the second group may be placed the "multi-tank" or "multi-compartment" reactor systems. In one of the "single-tank" systems one large tank is used, provided with as many as 10 agitators or stirrers. The phosphate rock and sulfuric acid are introduced each at one point in the tank. While seeming to have the advantage of simplicity, this system makes the addition of phosphate rock and sulfuric acid very difficult to accomplish without having localized excessive concentrations. The so-called "recirculation" is large but basically uncontrolled and wide variations in concentrations occur. In another so-called "single-tank" reactor system a small tank is placed concentrically in a single large tank to form an annulus between the two tanks. Phosphate rock is introduced at one end of a diameter and the sulfuric acid and return phosphoric acid (from the calcium sulfate filtration and washing system) are introduced together approximately at the other end into the annulus. The annulus is provided with a number of agitators and baffles are introduced in the annulus to cause the slurry to generally recirculate around the annulus, with the slurry production passing into the small center tank. This system provides fairly large recirculation rates although not under any positive control.

In the "multi-tank" or "multi-compartment" group the reactor system consists of a relatively large number of individually agitated tanks or compartments, usually between 6 and 12 in number, so arranged that the flow of slurry is generally in series from tank to tank (or compartment to compartment) and slurry is pumped from the last tank back to the first tank, thus providing recirculation. Although such pumping provides control of recirculation rates the pumping costs are high and recirculation rates in excess of 15 to 1 are rarely employed. Phosphate rock, sulfuric acid and return phosphoric acid are introduced at various points and the pumped stream of recirculation slurry is generally cooled before being returned to the system. Many variations of the systems just described are currently in operation and all of them operate at essentially atmospheric pressure. Equipment is large and costly with average residence times in the reactor system being from 4 hours to as much as 8 to 10 hours.

The production of phosphoric acid by the wet process is an exothermic reaction and relatively large quantities of heat must be removed in order to maintain the desired temperature in the reactor system. In some systems the sulfuric acid is diluted and the corresponding heat of dilution removed before the acid is introduced to the reactor system. This reduces the amount of heat generated in the reactor system and allows the sulfuric acid to be added to the reactor with less chance of localized overconcentration, since the acid is, in effect, pre-diluted with water. Although this procedure is widely practiced, it has certain disadvatnages. First, all water used for dilution of the sulfuric acid must be deducted from the total water allowable for use in washing the calcium sulfate free of phosphoric acid on the filter. This may result in higher losses if the same strength of phosphoric acid is to be produced, or lower strength of phosphoric acid if the quantity of wash water is not reduced. Second, assuming all other conditions remain the same, practical methods of reactor system cooling are based essentially on evaporative cooling (either by air or vacuum) and reducing the amount of heat available for the evaporation of water from the reactor system results in a lower strength of product phosphoric acid from the reactor system.

The removal of the exothermic heat of reaction is generally accomplished by one or the other of two methods and, occasionally, by a combination of both. The first method consists of blowing air into or below the surface of the slurry in the reactor. Large quantities of air are required, the cooling being obtained principally by evaporation of water into the air. By careful design of the jets introducing the air, power costs for air handling can be minimized but a number of disadvantages are encountered. The air jets become incrusted with solids and require periodic cleaning, often at eight-hour intervals. In addition, the air carries quantities of noxious fluorine-containing gases and fumes out of the reactor in very dilute concentrations. Even phosphate rock dust may be carried out. All of this large volume of air must be scrubbed clean before being released back to the atmosphere. Further, under adverse conditions of high atmospheric temperature and humidity, it may become difficult to introduce sufficient air into the reactor to remove the heat and keep the temperature of the reactor slurry at the desired level.

The second method of removing heat from the reactor system is by vacuum cooling. A portion of the reactor slurry is pumped into a vacuum chamber where the reduced pressure causes the boiling off of water and the cooled slurry returns, usually via a barometric leg, to the reactor system. It is usual practice for the pumped stream of recirculation slurry, which was referred to under the description of "multi-tank" reactor systems, to pass through such a vacuum chamber before being returned to the reactor system. Vacuum cooling can also be used with "single-tank" systems although air cooling is more generally used in such systems. The vacuum cooling method has the advantage of excellent control and also avoids diluting the fumes with the large quantities of air that make subsequent removal difficult. It has disadvantages, however, the principal one being the necessity of pumping very large quantities of slurry with attendant high power costs, high slurry line and pump maintenance, etc. Practical limitations of the pumping volume means that the maximum reduction of slurry temperature per pass through the vacuum chamber must be approached. This results in an appreciable increase in concentration causing excessive scaling in the vacuum chamber and associated lines. The relatively large change in concentration per pass also causes the precipitation of very fine crystals of calcium sulfate adversely affecting the subsequent filtration and washing system. Even with the vacuum cooling method the reactor system gives off a considerable volume of fumes and scrubbing systems are required but the volume is much smaller than encountered with the air cooling method.

With these precepts in mind, a primary object of this invention is to ensure that in the manufacture of phosphoric acid by the wet process, the formation of small calcium sulfate crystals is minimized and the formation of larger crystals more uniform in size and more easily filtered is maximized. In accordance with this invention, it has been found that this object can be achieved by introducing the phosphate rock and sulfuric acid into a circulating slurry of phosphoric acid and calcium sulfate at points separated from each other in space or time, the rate of introduction in the first case and the quantity of each increment introduced in the second case being small so that the alternate increases in concentration of calcium and sulfate are a small fraction of the total quantity of liquid present. At the same time the return phosphoric acid is added to the system separately from the phosphate rock and the sulfuric acid. In general, the phosphate rock is added such that the increase in calcium content does not exceed about 1%, preferably 0.5%, measured as CaO, and the sulfuric acid is added such that the increase in sulfate content does not exceed about 1.75%, preferably 0.875%, measured as $H_2SO_4$. The increase of calcium and sulfate content are calculated increases assuming dispersion and solution of all the phosphate rock and dispersion of all of the sulfuric acid into the slurry with no precipitation, i.e., as calcium sulfate.

The objects of this invention can be accomplished in a reactor system comprising, for example, two reactor vessels interconnected to provide a recirculating flow path with the two vessels being offset vertically. Phosphate rock is added to the lower vessel. The slurry is pumped from the lower vessel into the upper vessel and returns by gravity from the upper vessel to the lower vessel. Sulfuric acid is added to the reactor slurry as the slurry leaves the lower vessel and passes into the upper vessel. Very high recirculation rates can be provided at low pumping cost as the vertical arrangement of the vessels is such that the pump has little or no hydrostatic differential head to overcome, only the resistance to flow. Removal of heat by the evaporation of water can be accomplished by reduced pressure or vacuum, with provision made for release of vapors and fumes, from the surface of the stream of recirculating slurry in the upper vessel.

The process and arrangement of apparatus will be more fully understood from the detailed description hereinbelow, reference being taken to the accompanying drawings wherein FIG. 1 illustrates an arrangement of apparatus for use in accordance with this invention;

Figure 1:
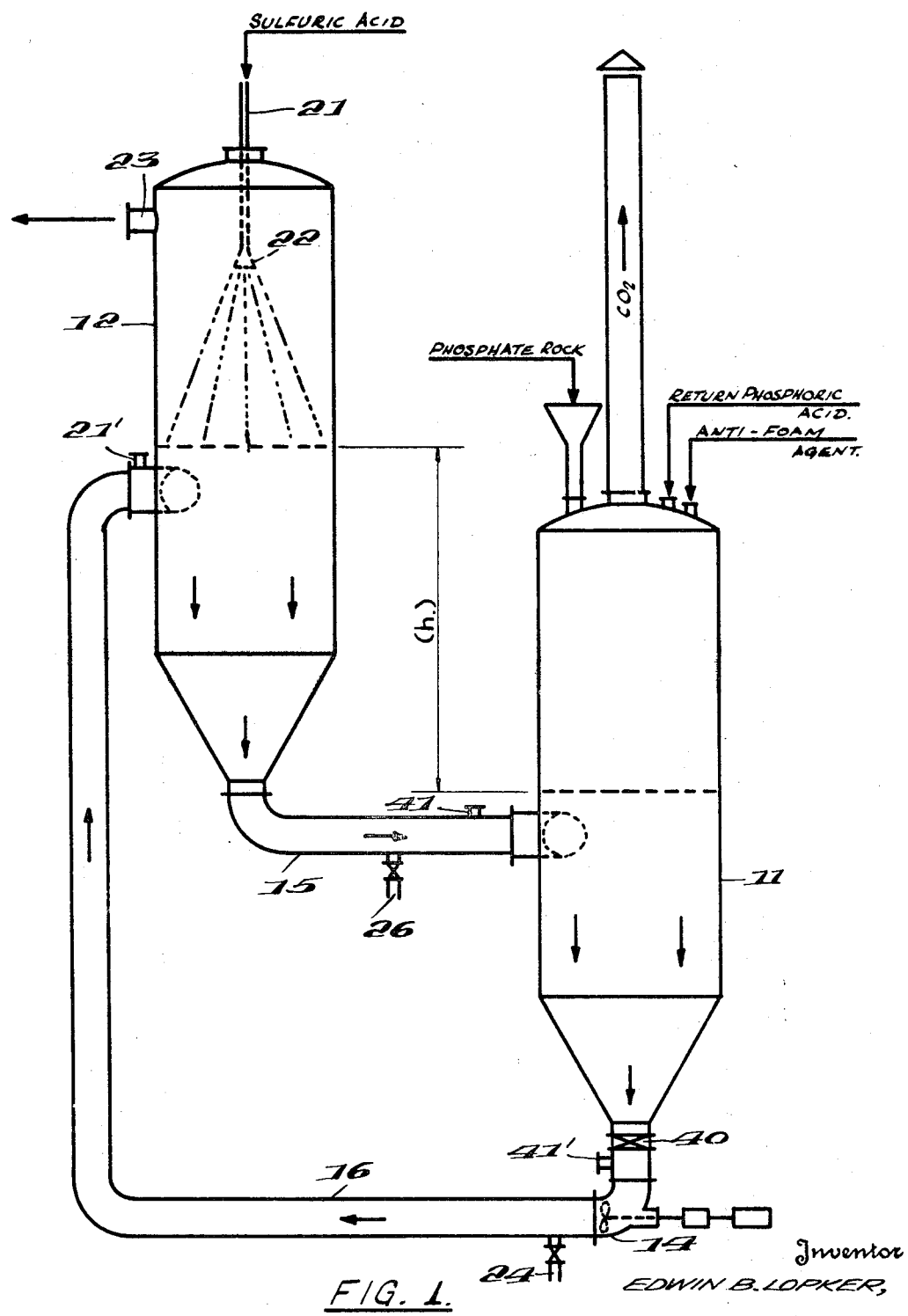

Referring now to FIG. 1, the vessels 11 and 12 are interconnected by conduits 15 and 16 to provide a closed circulation flow path. Vessels 11 and 12 are offset vertically a distance, indicated as ($h$), that is equal to the vacuum applied at conduit 23, when expressed as feet of slurry of the density existing in the reactor system. This permits vessel 12 to operate under the required vacuum, applied through conduit 23, while vessel 11 is at atmopsheric pressure. The phosphate rock is added directly to vessel 11 as indicated. The recirculating flow of reactor slurry through the flow path of the system is downward in vessel 11 to pump 14 thence via conduit 16 to vessel 12 where it enters approximately tangentially. The slurry flows downward in vessel 12 and out through conduit 15 to enter vessel 11. The slurry also enters vessel 11 approximately tangentially to produce a turbulent swirling in the upper portion of vessel 11 which is adequate to mix the added phosphate rock into the recirculating slurry. Thee return phosphoric acid (from the filter system, not shown) is introduced directly into vessel 11 as indicated or, alternatively, added to the recirculating slurry, either before or after, the slurry passes through vessel 11 at inlet 41 or 41', respectively. Sufficient height in vessel 11 is provided to accommodate the increase in slurry level when the system is shut down and the vacuum is shut off, equalizing the levels in vessels 11 and 12. Under these conditions pump 14 will continue slurry recirculation although at a reduced rate due to the hydrostatic head imposed on the pump. A valve 40 is provided at the bottom of vessel 11 so that slurry may be retained in the system with only conduit 16 needing to be drained if it is desired to inspect pump 14. The slurry production may be withdrawn through valve-controlled conduit 24 at the low point in the circulating piping or through valve-controlled conduit 26. The sulfuric acid is added through spray nozzle 22 fed by pipe 21. The sulfuric acid can also be introduced into conduit 16 through conduit 21' where the relatively high velocity of the recirculating slurry effectively disperses the sulfuric acid.

Figure 2:
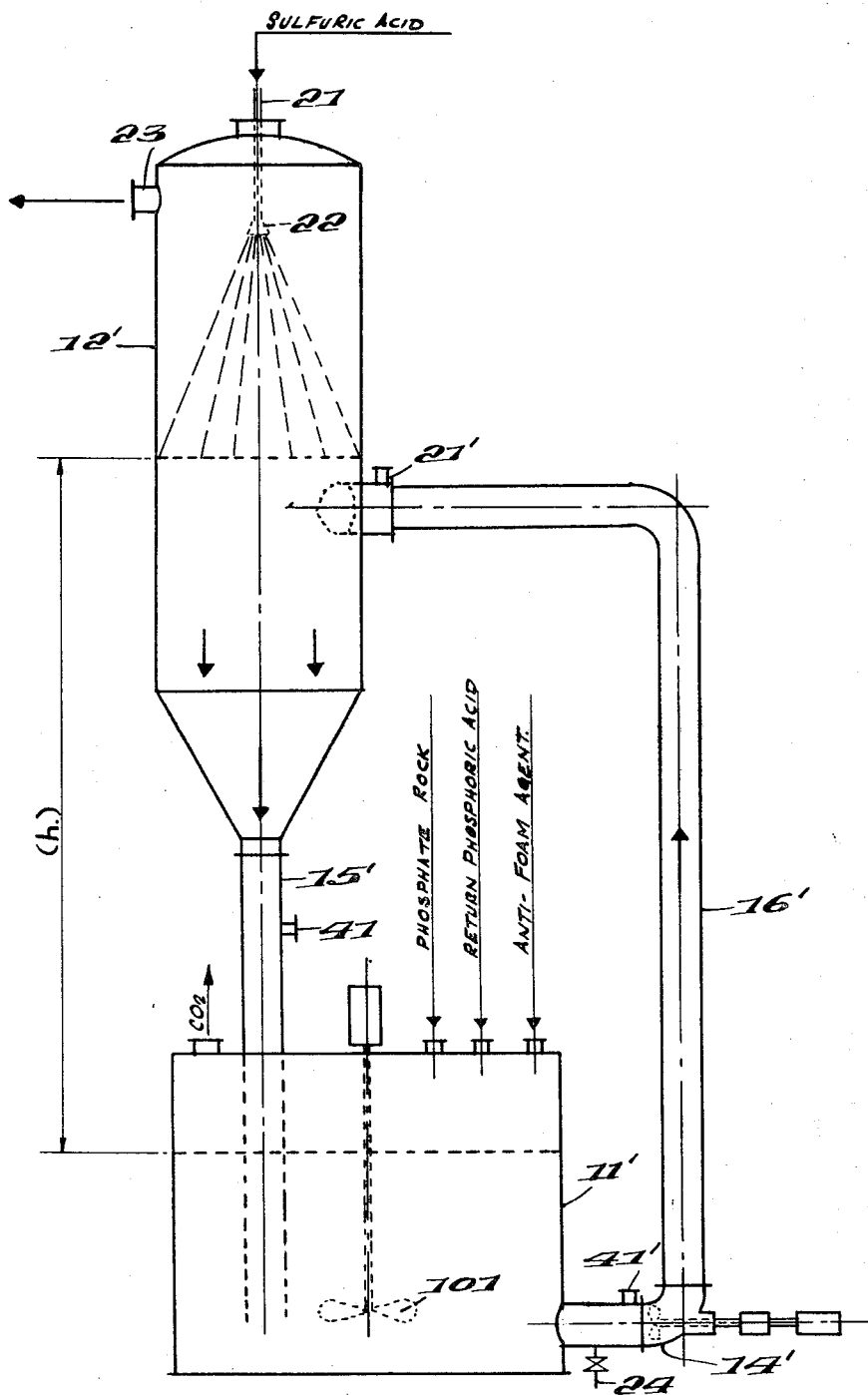
FIG. 2 illustrates a modification thereof.

As shown in FIG. 2, vessel 11 can be replaced by an agitated vessel 11'. The flow of recirculating slurry in FIG. 2 is from vessel 11' to pump 14', thence via conduit 16' to vessel 12' with the slurry returning to vessel 11' via conduit 15'. A vacuum applied in vessel 12' through conduit 23 maintains the differential slurry levels as indicated by ($h'$). Stirer 101 provides agitation in vessel 11'. Slurry removal and the addition of sulfuric acid, phosphate rock, return phosphoric acid and antifoam agent may be similar to that shown in FIG. 1 and indicated in FIG. 2.

Returning to FIG. 1, as the phosphate rock enters vessel 11 it is immediately dispersed into and mixes with the large volume of recirculating slurry. An antifoam agent can be added, if desired, and any $CO_2$ formed is quickly removed from vessel 11 as shown. The phosphate rock rapidly dissolves in the liquid phase of the recirculating slurry and so raises the calcium content of the liquid phase by a small amount. As this occurs, the liquid phase becomes reduced in sulfate content as calcium sulfate leaves the solution, largely by crystallization on the great mass of calcium sulfate crystals present in the recirculating slurry. It is known that the rate of solution of the phosphate rock is dependent upon the particle size of the rock. It has now also been found, however, that the rate of solution of the phosphate rock can be so rapid that substantial quantities of calcium sulfate may be crystallized under conditions where more calcium is present in solution in the liquid phase of the reactor slurry than necessary to maintain the rate of crystal growth of the calcium sulfate. This results in higher losses than necessary due to the concurrent crystallization of calcium phosphate as has been previously mentioned. In this connection, in accordance with this invention, the retention time in reactor vessel 11 is intentionally restricted to minimize this condition and the phosphate rock is added in a manner to avoid substantially increasing the calcium content in the recirculating slurry. It is this small change that insures growth of the calcium sulfate crystals and avoids precipitation of excessive quantities of fine crystals. As crystallization is occurring continuously in the reactor system these calculated increases in concentration are not to be found by analysis of the reactor slurry. The desirable calculated increase in concentration may be determined experimentally and will vary with different types of phosphate rock but generally should not exceed 1%, preferably 0.5%, measured as CaO, when calculated for complete dispersion and/or solution but not precipitation. In this connection, it should be noted that the rate of flow of recirculating slurry is very large.

The addition of the sulfuric acid raises the sulfate content of the liquid phase of the slurry by a small amount and the calcium content is reduced by crystallization of calcium sulfate, largely on the great mass of calcium sulfate crystals already present in the recirculating slurry. Again it is important to avoid substantial increases in the sulfate content. Generally, the increase in sulfate should not exceed about 1.75%, preferably 0.875%, measured as $H_2SO_4$, when calculated for complete dispersion. This small change assists in insuring growth of the calcium sulfate crystals and avoiding precipitation of excessive quantities of fine crystals.

Removal of the exothermic heat of reaction occurs by vaporization of water under the reduced pressure conditions maintained in the upper portion of reactor vessel 12, and the vapor, along with various non-condensables and fumes, leaves the surface of the recirculating slurry in reactor vessel 12 and passes, via outlet conduit 23 to scrubbing, condensing and vacuum producing equipment (not shown). Although the quantity of heat to be removed is large, the quantity of recirculating slurry is relatively so much greater that only very small temperature differences occur in the reactor system. For example, with an assumed grade of phosphate rock of 31% $P_2O_5$, and using sulfuric acid at 93% $H_2SO_4$, and producing phosphoric acid (the liquid phase in the reactor slurry) at a strength of 32% $P_2O_5$, the maximum temperature differential of the slurry, when providing a large but reasonable and conservative rate of recirculation, would be about 1½ degrees centigrade and the increase in $P_2O_5$ content of the phosphoric acid in the slurry is only about 9/100 of 1%. The result of these very small differentials is to essentially eliminate both the troublesome scaling and the precipitation of excessive quantities of fine crystals of calcium sulfate. Present commercial systems using vacuum cooling commonly operate with differentials 3 to 4 times as great as these.

Figure 3:
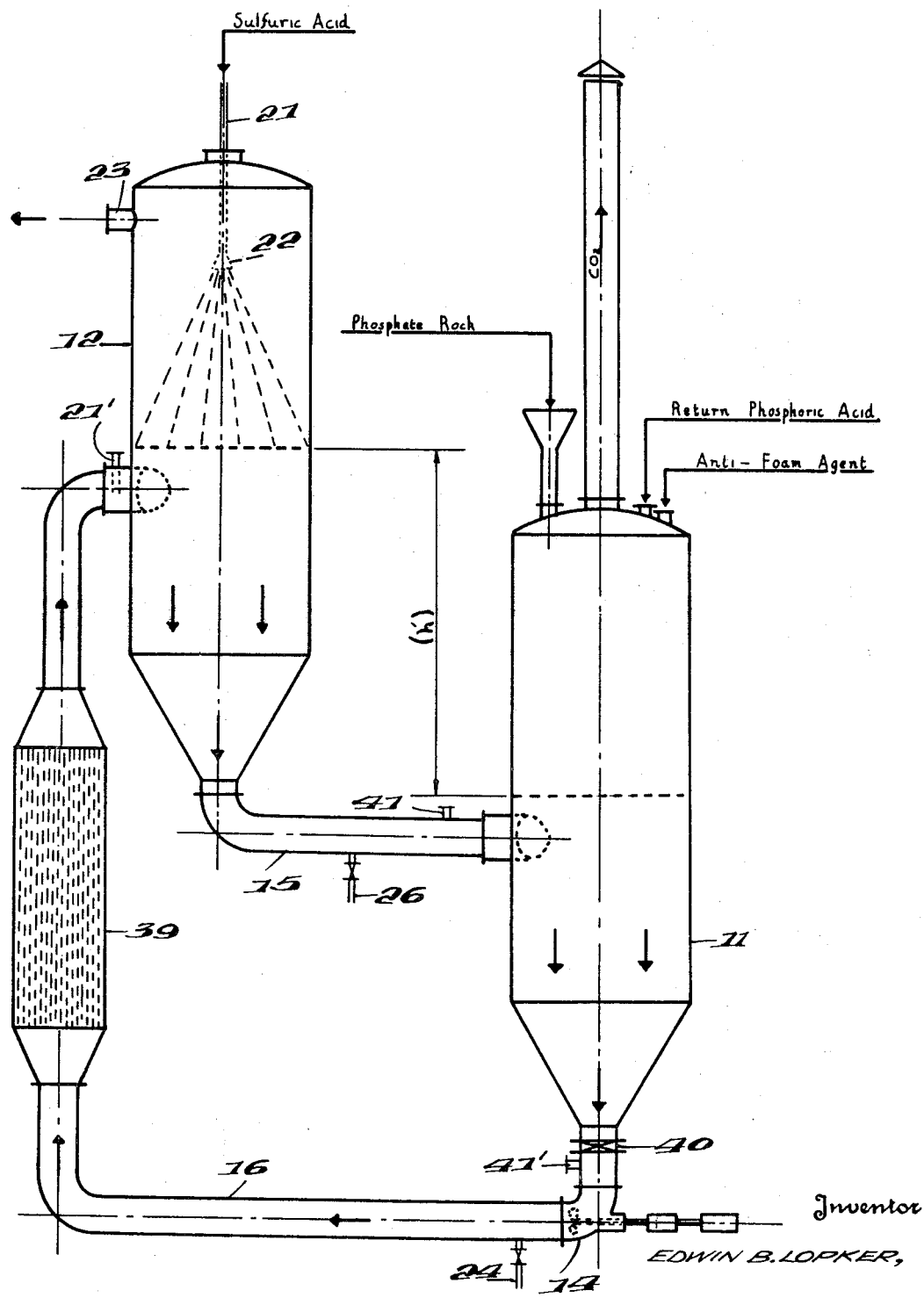
FIG. 3 illustrates a further modification.

FIG. 3 illustrates introduction of an exchanger 39 into the circulating system to allow the input of additional heat to the reactor system and so allow the production of a strength of phosphoric acid directly from the system that otherwise might not be possible. The high solids content of the recirculating slurry virtually eliminates fouling of the heat exchanger surfaces, a problem commonly experienced in present commercial operation of vacuum evaporators on wet process phosphoric acid. The practical advantages of being able to produce phosphoric acid from the reactor system at higher strengths than possible by presently utilized design may be briefly illustrated. Assuming that a phosphoric acid of 31% $P_2O_5$ is produced from the reactor system and that this acid is then concentrated to 54% $P_2O_5$, the production of phosphoric acid at about 36% $P_2O_5$ would eliminate about one-third of the previously required evaporative capacity, at about 40% $P_2O_5$ about one-half is eliminated, at about 43% $P_2O_5$ two-thirds is eliminated, etc. With the designs now operating commercially, using the best practice in evaporative cooling, the strength of phosphoric acid produced from the reactor system is generally about 30% to 32% $P_2O_5$. A substantial proportion of the phosphoric acid produced from commerial reactor systems is subsequently concentrated, usually to 54% $P_2O_5$. General practice is to do this concentration in vacuum evaporators with forced circulation through external heat exchangers using low pressure steam as the source of heat input to the exchangers.

The phosphate rock is introduced in solid form into the reaction vessel 11 or 11' rather than as a slurry in the return phosphoric acid. It has been found that certain phosphate rocks, usually of the sedimentary type, can dissolve very rapidly in the return phosphoric acid. As the return phosphoric acid contains some sulfuric acid, the excessively rapid solution of the rock in the return acid tends to increase the dissolved calcium sufficiently so as to precipitate fine crystals of calcium sulfate that interfere with the proper crystallization and growth of calcium sulfate which is intended to occur in the reactor system proper. For similar reasons the sulfuric acid is not mixed with the return phosphoric acid since the return phosphoric acid also contains some calcium and by mixing these materials the sulfate concentration would be raised to a very high level also resulting in the precipitation of very fine crystals of calcium sulfate.

An alternate method of operating the systems as shown in both FIGS. 1 and 2 is to add the sulfuric acid to the same vessel into which the phosphate rock is added but to alternate the additions. This method separates the addition of phosphate rock and sulfuric acid by a time dimension rather than by a physical dimension as has been described up to this point. That is to say, the additions of phosphate rock and sulfuric acid are carried out in alternate time sequence. In this method the phosphate rock is added for a short period of time and, after a very short interval, the sulfuric acid is added, again over a short period. After another very short interval, phosphate rock is again added and so on. The individual quantities of phosphate rock and of sulfuric acid that are so separately added must not be so great in relation to the volume in the reactor system as to substantially exceed the very small increases in calcium (CaO) and sulfate ($H_2SO_4$) concentrations that have been previously referred to. The very small change in temperature obtained by the high recirculation of slurry through the vacuum vessel is also important. The return phosphoric acid may also be added in such an intermittent manner or continuously as may be desired. This principle of alternate incremental addition of phosphate rock and sulphuric acid to the slurry in any reactor system, even without the additional advantages given by maintaining a substantially contant temperature, and irrespective of the method of cooling, will produce calcium sulfate crystals with a very marked increase in filterability. Where the arrangement of the reactor system is suitable, the addition of the phosphate rock and the sulfuric acid may be alternated incrementally. For example, in a multicompartment system phosphate rock additions may be made to the 1st, 3rd, 5th, 7th, 9th, etc. compartments with the sulfuric acid added to the 2nd, 4th, 6th, 8th, 10th, etc.

Although the operation has been described stepwise, it will be understood that in actual practice it is continuous, the inputs and outputs of the system as well as the recirculation of slurry within the system being carried out continuously. Although the phosphate rock is largely dissolved in reactor vessel 11, the crystallization of calcium sulfate occurs, to greater or lesser extents, in the entire reactor system. Not shown is the apparatus needed to measure and control the quantities of phosphate rock, sulfuric acid and return acid introduced to the reactor system as these may be in accord with conventional practice in the industry.

Assuming, as previously described, that all proposed combinations of temperature levels and phosphoric acid strengths are so selected as to produce in each case a stable calcium sulfate crystal, then the final selection of those operating conditions which are chosen as the best level at which to operate the reactor system, either with or without a heat exchanger, is governed largely by economic factors. For example, if the ultimate strength of phosphoric acid required is produced directly by the reactor system it is apparent this would result in the elimination of all of the otherwise required apparatus for concentrating the acid. In addition, when the acid is concentrated additional solids are precipitated and must be removed from the concentrated acid by filtration or by centrifuging. Under the conditions outlined, i.e., direct production of the ultimate strength of acid required, the clarifying apparatus and operation would also be eliminated. Although this would seem to provide substantial economic advantages for such a proposed level of operation the effect of this on the reactor system and on the filtration system must be evaluated. For a given operating temperature level, as the strength of the phosphoric acid in the reactor system is increased the viscosity of the acid increases. In order to maintain sufficient fluidity in the recirculating slurry in the reactor system to facilitate ready dispersion of the reactants and to provide favorable conditions for crystal growth, the solids content of the slurry may need to be reduced. This can be done by withdrawing from the reactor system a greater quantity of slurry, filtering off and washing the solids, and returning all of the excess of liquid, over and above the net production, to the reactor system. Even so, the calcium sulfate crystals produced tend to be smaller and more difficult to efficiently filter and wash. In addition, the increased viscosity of the phosphoric acid, the liquid phase in the slurry, makes the filtration more difficult. The sum of these effects may require additional filtration system capacity and this may offset, to a greater or lesser degree, the elimination of the concentrating and clarifying apparatus.

The following example serves to further illustrate this invention.

Operating temperature level is 75° C. The basic raw materials are phosphate rock of fairly high reactivity containing 31% $P_2O_5$, sulfuric acid supplied at 93% $H_2SO_4$, and return phosphoric acid containing about 19% $P_2O_5$.

Phosphate rock is supplied vessel 11 at a rate of 925 pounds per minute and return acid is supplied at the rate of 200 gallons per minute.

The reactor slurry, a mixture of 32% $P_2O_5$ phosphoric acid and gypsum crystals, will be about 40% solids by weight and is recirculated at a rate of about 16,000 gallons per minute. The phosphate rock entering encounters the steam of reactor slurry flowing into vessel 11. It is important to note that the volume of the recirculating slurry is so large that the solution of all of the phosphate rock added to the reactor slurry going to reactor vessel 11 raises the calcium content (CaO) of the phosphoric acid in the recirculating slurry by only about 3/10 of 1% even if no calcium left the solution, due to crystallization of calcium sulfate. The quantity of sulfuric acid introduced in vessel 12 is 825 pounds per minute and the volume is about 54 gallons per minute. The sulfuric acid is introduced as a coarse heavy spray and the volumetric dilution of the sulfuric acid by the reactor slurry is about 300 to 1. The dispersion of all of the sulfuric acid into the recirculating slurry raises the sulfate content ($H_2SO_4$) of the phosphoric acid in the slurry by less than 6/10 of 1% even if no sulfate left the solution due to crystallization of calcium sulfate.

To maintain the level in vessel 12, 260 gallons per minute of slurry is withdrawn. This amounts to less than 2% of the slurry recirculation rate and the average residence time in the reactor vessels including piping and pump is about 82 minutes. The example provides a unit with a productive capacity of 200 tons of $P_2O_5$ per day utilizing the principles of this invention. In this unit the phosphoric acid will be produced at a strength of 32% $P_2O_5$ and the calcium sulfate will be crystallized as gypsum ($CaSO_4 \cdot 2H_2O$).

It is claimed:

1. A process for the manufacture of phosphoric acid from phosphate rock and sulfuric acid comprising passing a slurry containing phosphoric acid and calcium sulfate through means defining a closed flow path, said means comprising first and second vessels interconnected by conduit means external to said vessels, said slurry being passed through said vessels without reversals in direction of flow therein, maintaining within said first vessel a level of slurry vertically offset from the level of slurry maintained within said second vessel, separately adding phosphoric acid, obtained as hereinafter defined, phosphate rock, and sulfuric acid reactants to said slurry so that each of the reactants so added are dispersed in said slurry and not concentrated at the point of addition of the other, controlling the addition of reactants to said slurry so that the increases in calcium content and sulfate content respectively of the liquid phase of said slurry caused by such addition of reactants are, such as to preclude significant coating of undissolved phosphate rock with calcium sulfate, significant calcium phosphate precipitation and excessive calcium sulfate crystallization in fine crystals, and withdrawing phosphoric acid and calcium sulfate from said process and adding a portion of the phosphoric acid so withdrawn to said slurry as aforesaid.

2. The process of claim 1 wherein the increase in calcium content does not exceed about 1%, measured as CaO, when calculated as complete dispersion and solution but without precipitation and the increase in sulfate content does not exceed about 1.75% measured as $H_2SO_4$, when calculated as complete dispersion but without precipitation.

3. The process of claim 2 wherein the calculated increases in concentration do not exceed 0.5% measured as CaO and 0.875% measured as $H_2SO_4$.

4. The process of claim 2, further including controlling the temperature of said slurry by passing substantially all the slurry through a vacuum chamber for the removal of heat by the evaporation of water to maintain the temperature of the slurry essentially constant.

5. The process of claim 4 wherein the temperature is maintained constant throughout the slurry to within about 5° C.

6. The process of claim 5 wherein the temperature is maintained constant throughout the slurry to within about 2.5° C.

7. The process of claim 4 wherein the time from the addition of phosphate rock before it contacts the increased concentration of sulfuric acid is such in relation to the size of the rock particles that a part thereof has not dissolved in the liquid before encountering such increased concentration of acid.

8. The process of claim 7 further including introducing heat into the system by means of a heat exchanger situated in the flow path for said slurry.

9. The process of claim 1 wherein the separation of the addition of phosphate rock and sulfuric acid to said slurry is attained by physical separation of the respective points of addition of phosphate rock and sulfuric acid along said flow path.

10. The process of claim 9 wherein said slurry passes successively through the vessels along said flow path and the phosphate rock and sulfuric acid are added to alternate vessels.

11. The process of claim 1 wherein the separation of the addition of phosphate rock and sulfuric acid is attained by adding the phosphate rock and the sulfuric acid in alternate time sequence.

12. The process of claim 1 wherein the time from the addition of phosphate rock before it contacts the increased concentration of sulfuric acid is such in relation to the size of the rock particles that a part thereof has not dissolved in the liquid before encountering such increased concentration of acid.

13. The process of claim 1 further including introducing heat into the system by means of a heat exchanger situated in the flow path for said slurry.

14. The process of claim 1 wherein said slurry is passed through said flow path in a continuous circuit closing upon itself so that the hydrostatic pressure head of the slurry is balanced throughout said circuitous flow path.

15. A system for the manufacture of phosphoric acid from phosphate rock and sulfuric acid comprising a first vessel maintained under vacuum and connected in flow communication with a second vessel by conduit means external to said vessels, said first and second vessels and said conduit means together defining a circuitous flow path adapted to permit passage without reversals in direction of flow within said vessels of a slurry containing phosphoric acid and calcium sulfate through said first vessel thence through said conduit means thence through said second vessel and back to said first vessel and adapted to maintain a slurry level in said first vessel vertically offset from the slurry level in said second vessel, pump means adapted to circulate said slurry through said circuitous flow path, outlet means adapted to withdraw a portion of said slurry circulating through said circuitous flow path, and inlet means adapted to separately add phosphate rock, sulfuric acid and return phosphoric acid to said slurry passing through said circuitous flow path so that each of the materials so added is dispersed in said slurry and not concentrated at the point of addition of the others.

16. The system of claim 15 in which said first vacuum vessel is adapted to apply a vacuum sufficient to maintain the level of said slurry within said vacuum vessel at an elevation greater than the level of said slurry within the remainder of said flow path without imposing a hydrostatic pressure head on said pump means.

17. The system of claim 15 wherein separate inlet means are provided for the sulfuric acid, the phosphate rock and the return phosphoric acid and said separate inlet means are physically spaced one from the other along said circuitous flow path a distance sufficient to permit the dispersion in said slurry of each of the materials so added and preclude concentration of the materials so added at the point of addition of the other materials so added.

18. The system of claim 15 wherein the inlet means for the addition of sulfuric acid, phosphate rock and return phosphoric acid are adapted to add the materials in alternate time sequence so as to permit the dispersion in said slurry of each of the materials so added and preclude concentration of the material previously added at the time and point of addition of the other mateirals added.

19. The system of claim 15 wherein the inlet means for the addition of sulfuric acid are adapted to introduce the sulfuric acid in the form of a spray.

References Cited

UNITED STATES PATENTS

| 2,109,347 | 2/1938 | Beckhuis. | |
| 3,416,889 | 12/1968 | Caldwell | 23—165 |
| 2,897,053 | 7/1959 | Svanoe | 23—165 |
| 2,950,171 | 8/1960 | Macq | 23—165 |
| 3,257,168 | 6/1966 | Chelminski | 23—165 |

HERBERT T. CARTER, Primary Examiner

U.S. Cl. X.R.

23—122, 260, 285

PO-1050
(5/69)

UNITED STATES PATENT OFFICE
CERTIFICATE OF CORRECTION

Patent No. 3,522,003      Dated July 28, 1970

Inventor(s) Edwin B. Lopker

It is certified that error appears in the above-identified patent and that said Letters Patent are hereby corrected as shown below:

Column 2, line 29, for "centrigrade" read --centigrade--; line 32, for "centrigrade" read --centigrade--; lines 33 and 34, respectively, for "crystallizer" read --crystallize--; line 59, for "coucium" read --calcium--. Column 8, line 72, for "steam" read --stream--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents